US006182394B1

(12) United States Patent
Bassler

(10) Patent No.: US 6,182,394 B1
(45) Date of Patent: Feb. 6, 2001

(54) PLANT WATERING DEVICE

(76) Inventor: Louis M. Bassler, 400 Jordan Ave., Montoursville, PA (US) 17754

( * ) Notice: Under 35 U.S.C. 154(b), the term of this patent shall be extended for 0 days.

(21) Appl. No.: 09/276,241

(22) Filed: Mar. 25, 1999

(51) Int. Cl.$^7$ .................................................. A01G 9/02
(52) U.S. Cl. .................................... 47/65.5; 47/79; 47/75
(58) Field of Search ........................... 47/79, 65.5, 62 R, 47/87, 75

(56) References Cited

U.S. PATENT DOCUMENTS

| D. 259,777 | 7/1981 | Ehrreich .................................... 54/50 |
|---|---|---|
| D. 278,075 | 3/1985 | Dryen .................................... 431/120 |
| D. 278,076 | 3/1985 | Dryen .................................... 310/112 |
| D. 352,480 | * 11/1994 | Carlson ................................ D11/153 |
| 661,411 | * 11/1900 | Lonitz .................................... 47/65.5 |
| 3,604,150 | * 9/1971 | Baumann .................................... 47/79 |
| 4,167,080 | 9/1979 | Mickelson .................................. 47/71 |
| 4,189,867 | * 2/1980 | Schneck .................................. 47/62 R |
| 4,198,784 | 4/1980 | Sukert ....................................... 47/79 |
| 4,226,048 | 10/1980 | Molnar ....................................... 47/81 |
| 4,336,666 | 6/1982 | Caso ....................................... 47/48.5 |
| 4,553,352 | 11/1985 | Powell ....................................... 47/71 |
| 4,850,134 | * 7/1989 | Snekkenes ................................. 47/18 |
| 5,179,800 | 1/1993 | Huang ....................................... 47/73 |
| 5,282,335 | 2/1994 | Holtkamp, Jr. ........................... 47/81 |
| 5,444,940 | 8/1995 | White-Wexler et al. ................. 47/82 |
| 6,108,971 | * 8/2000 | Zaremba ................................. 47/65.5 |

FOREIGN PATENT DOCUMENTS

2557760 * 1/1984 (FR) .
2568446 * 8/1984 (FR) .

* cited by examiner

Primary Examiner—Peter M. Poon
Assistant Examiner—Judith A. Nelson
(74) Attorney, Agent, or Firm—Thomas R. Shaffer, Esq.

(57) ABSTRACT

A plant watering device is disclosed which includes a planter tray having an upper surface for supporting potted plants. The planter tray has a plurality of legs depending downwardly from the upper surface with the upper surface located above a bottom wall of a water container. The water container has an open top, closed side walls and a closed bottom wall which define a reservoir to receive water or water mixed with plant food. The water container includes deep recessed pockets in the bottom wall of the water container positioned to receive and support the legs of the planter tray when the planter tray is in a lower watering position. The water container also includes shallow recessed pockets in the bottom wall of said water container positioned to receive and support the legs of the planter tray when the planter tray is in an upper drainage position. When the planter tray is manually moved to the lower watering position, potted plants supported on the planter tray are partially submersed to allow watering thereof. When the planter tray is manually moved to the upper drainage position, potted plants supported on the planter tray are located completely above the liquid.

22 Claims, 12 Drawing Sheets

PLANT WATERING DEVICE

BACKGROUND OF THE INVENTION

1. Field of the Invention

The present invention relates to a plant watering device. More specifically, it relates to a watering device having a planter tray manually movable between an upper drainage position and a lower watering position.

2. Description of the Prior Art

A variety of watering devices are known in the art. For example, U.S. Pat. No. 5,282,335 discloses a complex automatic self watering dish garden for plants which includes many separate interlocking pieces. The device relies upon a water absorbing member which extends from the growing medium through the bottom of the tray into the liquid holding reservoir to effectuate watering. U.S. Pat. No. 4,226,048 also utilizes a water transfer element to facilitate watering. U.S. Pat. No. 4,336,666 utilizes tubular metering nozzles for this purpose. U.S. Pat. No. 4,198,784 discloses an automatic plant watering device which has upper and lower containers. A flow regulator is provided for watering and the upper container preferably includes drain holes to allow drainage of excess liquid.

U.S. Pat. No. 4,553,352 discloses a plant container for draining moisture from the soil which includes a main container and a rotatable reservoir. Fluid is allowed to pass from the main container to the reservoir when conduits of the reservoir are aligned with orifices in the main container. By rotating the reservoir tray, fluid can be either drained from the soil or stored in the reservoir tray.

U.S. Pat. No. 4,167,080 discloses a planter having a self-indexing removable drain dish which catches water which drains from a bottom drain hole of a potted plant. This patent does not provide a means of watering the potter plant from the bottom of the pot. U.S. Pat. No. 5,444,940 discloses a terraced planter which provides separate plant beds in individual compartments. The compartments have bottom holes to allow drainage and the planter preferably provides a drip pan to catch excess water.

U.S. Pat. No. 5,179,800 discloses a growing tray which allows for air-pruning of plant roots. The plant tray has a surrounding edge to hold water above the top of the tray cell or microfeeding holes for self watering.

U.S. design Pat. Nos. D278,076; D278,075; and D259,777 disclose other plant watering and root irrigating systems.

There remains a need for a simple, inexpensive plant watering device which allows for the easy and convenient manual watering of potted plants.

SUMMARY OF THE INVENTION

The present invention provides a plant watering device which includes a planter tray having an upper surface for supporting potted plants and having a plurality of legs depending downwardly from said upper surface, said planter tray sized and configured to be received and supported by said legs in a manner whereby said upper surface is located above a bottom wall of a water container. A water container is provided having an open top and closed side walls and a closed bottom wall which define a reservoir to receive a liquid, said water container is sized to receive said planter tray. A lower supporting means is provided which is located in the bottom wall of said water container and located at a first lower elevational position, said lower supporting means is adapted to receive and support the legs of said planter tray such that the planter tray is positioned in a lower watering position. An upper supporting means is also provided and is located in the bottom wall of said water container located at a second upper elevational position, said upper supporting means is adapted to receive and support the legs of said planter tray such that the planter tray is positioned in an upper position, whereby when said planter tray is manually moved to said lower position, potted plants supported on said planter tray will be partially submersed in said liquid to allow watering thereof and when said planter tray is manually moved to said upper drainage position, potted plants supported on said planter tray will be located completely above said liquid.

Preferably, the planter tray has a plurality of holes provided in the upper surface thereof. Such holes are sized to provide access to human fingers to allow positioning and moving of the planter tray. The holes also allow the passage of water vapor from water or liquid contained in said water container to reach potted plants supported on said upper surface.

Preferably, the planter tray is generally square in shape and has at least four legs, with one leg located at each corner of said planter tray. The planter tray also preferably has at least one center leg located near the center of said planter tray. The center leg has a drain opening therein to allow liquid on said upper surface to drain into said water container.

The upper surface of said planter tray is preferably formed to provide a plurality of channels therein to provide additional structural strength to said upper surface. The planter tray also preferably is formed to provide a plurality of drainage channels therein with at least one drain opening in at least one of said drainage channels to allow liquid on said upper surface to drain into said water container. Preferably, at least some of said drainage channels extend radially outwardly from the center of said upper surface of said planter tray and wherein a drain opening is provided at the center of said upper surface in a drainage channel. In the preferred embodiment of the invention, at least some of said drainage channels are also provided at locations parallel to outside perimeter edges of said upper surface of the planter tray. Preferably, both small drainage channels and large drainage channels (40) are provided wherein the small drainage channels empty into the large drainage channels and wherein said at least one drain opening (42) is provided in at least one of said large channels.

The planter tray is preferably formed of an injection molded material comprising at least one of polypropylene, polyethylene, and polystyrene. The water container is preferably formed of a blow molded material comprising at least one of polypropylene, polyethylene, and polystyrene.

The water container is integrally formed to include said lower supporting means and said upper supporting means. Preferably, the upper supporting means comprises shallow recessed pockets in the bottom wall of said water container, said shallow recessed pockets are positioned to receive and support the legs of said planter tray when said planter tray is in an upper drainage position. The lower supporting means preferably comprises deep recessed pockets in the bottom wall of said water container, said deep recessed pockets are positioned to receive and support the legs of said planter tray when said planter tray is in a lower watering position. The shallow and deep recessed pockets are preferably located adjacent to one another.

In an alternative embodiment of the invention, the lower supporting means comprises first leg retainers on the bottom wall of said water container, said first leg retainers positioned to receive and support the legs of said planter tray when said planter tray is in a lower watering position, and said upper supporting means comprises elevated second leg retainers extending above the bottom wall of said water container positioned to receive and support the legs of said planter tray when said planter tray is in an upper drainage position.

In the preferred embodiment of the invention, a plant watering device includes:

a generally square planter tray having an upper surface for supporting potted plants and having five legs depending downwardly from said upper surface, said legs positioned on the four corners and in the center of said planter tray, said planter tray is sized and configured to be received and supported by said legs in a manner whereby said upper surface is located above a bottom wall of a water container, said upper surface of said planter tray having a plurality of drainage channels therein with at least one drain opening in at least one of the said drainage channels to allow liquid on said upper surface to drain into said water container;

a generally square water container having an open top and closed side walls and a closed bottom wall which define a reservoir to receive a liquid, lower supporting means located in the bottom wall of said water container and located at a first lower elevational position, said lower supporting means adapted to receive and support the legs of said planter tray such that the planter tray is positioned in a lower position; and upper supporting means located in the bottom wall of said water container located at a second upper elevational position, said upper supporting means adapted to receive and support the legs of said planter tray such that the planter tray is positioned in an upper drainage position, wherein said lower supporting means comprises deep recessed pockets in the bottom wall of said water container, said deep recessed pockets are positioned to receive and support the legs of said planter tray when said planter tray is in a lower watering position, said upper supporting means comprises shallow recessed pockets in the bottom wall of said water container, said shallow recessed pockets are positioned to receive and support the legs of said planter tray when said planter tray is in an upper drainage position, whereby when said planter tray is manually moved to said lower watering position, potted plants supported on said planter tray will be partially submersed in said liquid to allow watering thereof and when said planter tray is manually moved to said upper drainage position, potted plants supported on said planter tray will be located completely above said liquid.

It is an object of the present invention to provide a plant watering device which is manually movable between an upper drainage position and a lower watering position.

It is an object of the present invention to provide a simple and inexpensive device which preferably has only two component parts.

It is an object of the present invention to provide a device which can be molded from plastic and preferably from recycled plastic materials.

It is an object of the invention to provide a plant watering device which allows for bottom watering of potted plants.

These and other objects of the present invention will be more fully explained upon reference to the drawings and the detailed description of the preferred embodiments of the present invention which follow.

DETAILED DESCRIPTION OF THE PREFERRED EMBODIMENTS

Figure 1:
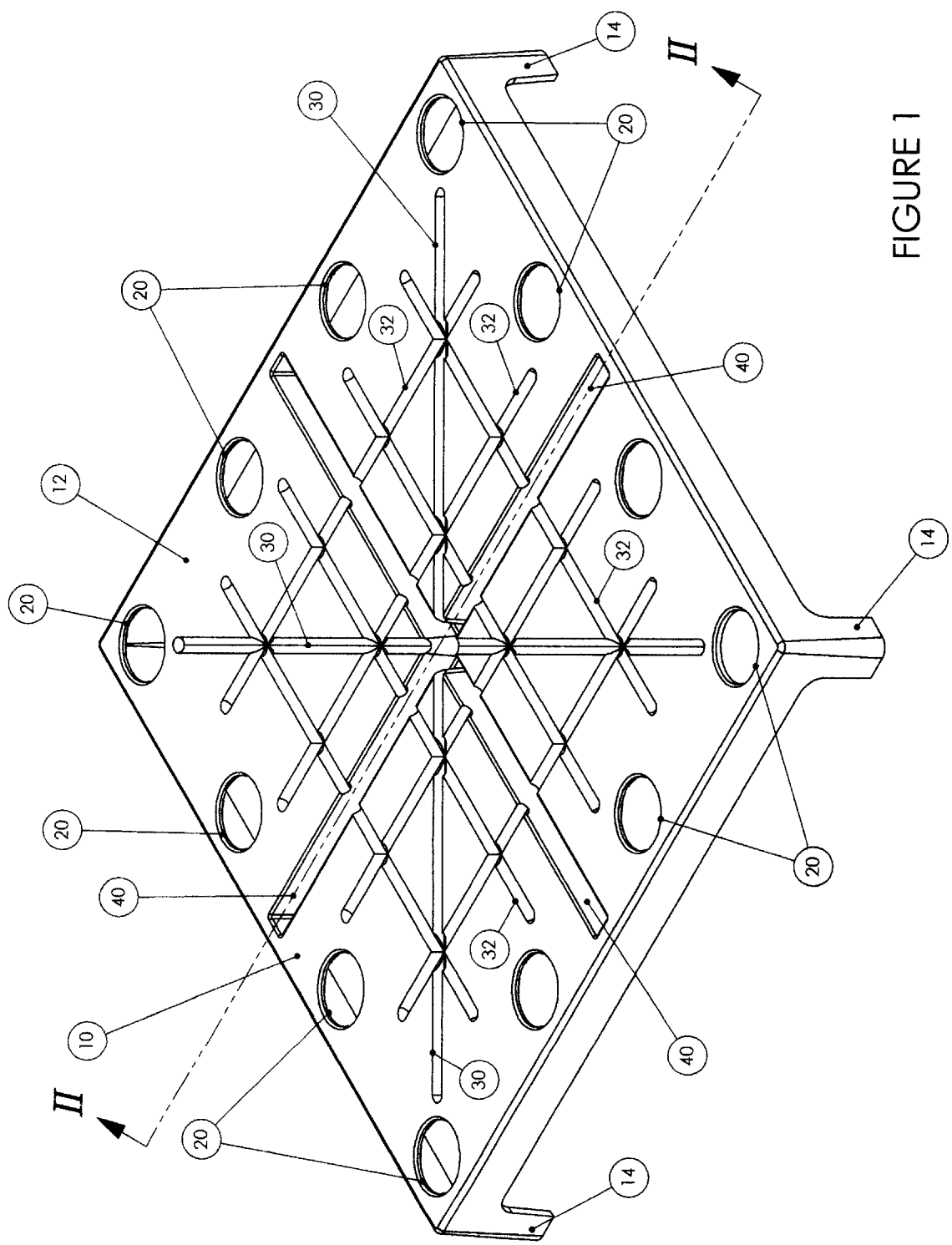
FIG. 1 is an isometric view of the top side of the planter tray of the present invention.
Figure 2:
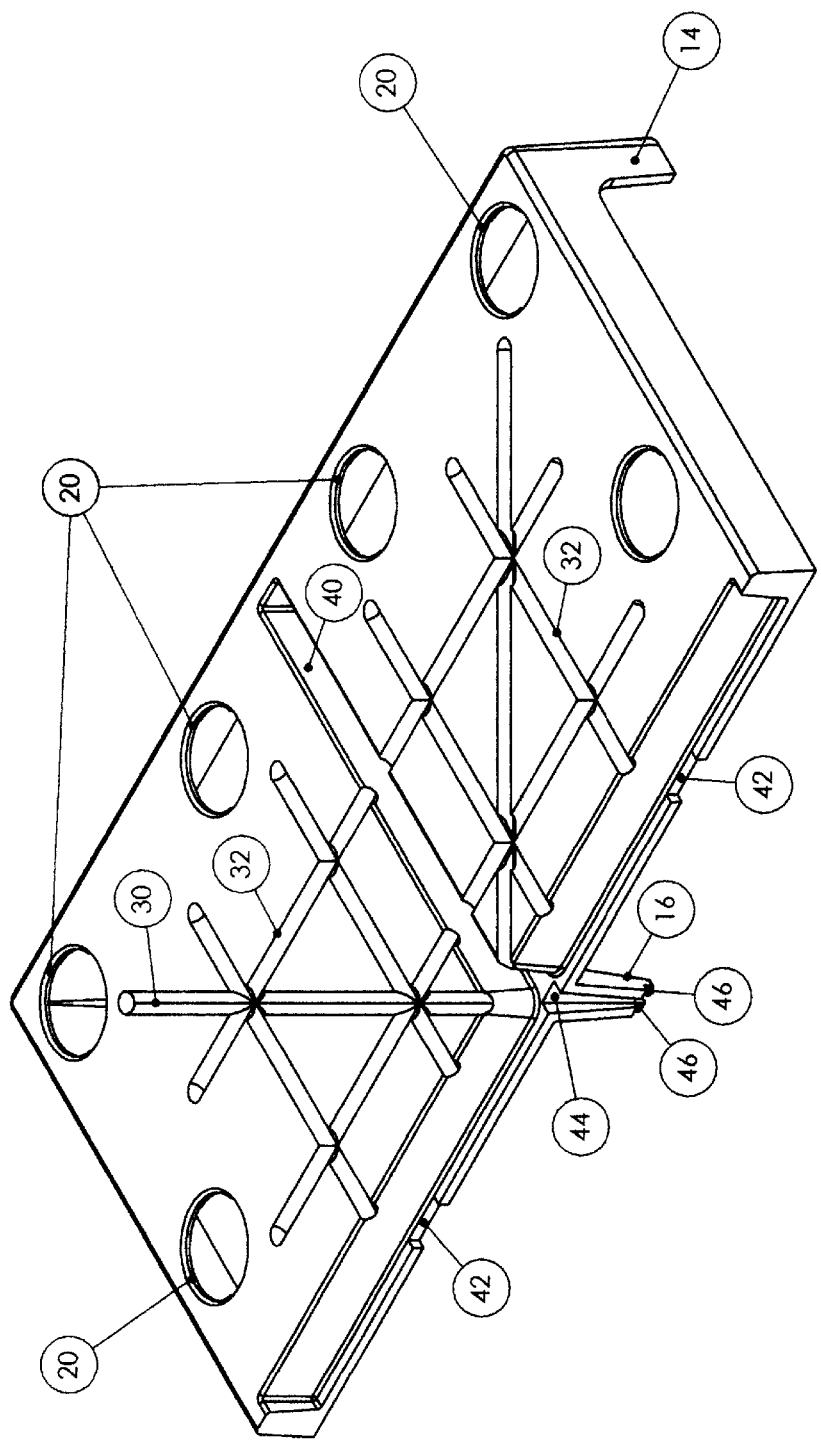
FIG. 2 is an isometric view of a portion of the planter tray of FIG. 1 taken on the line II-II of FIG. 1.
Figure 3:
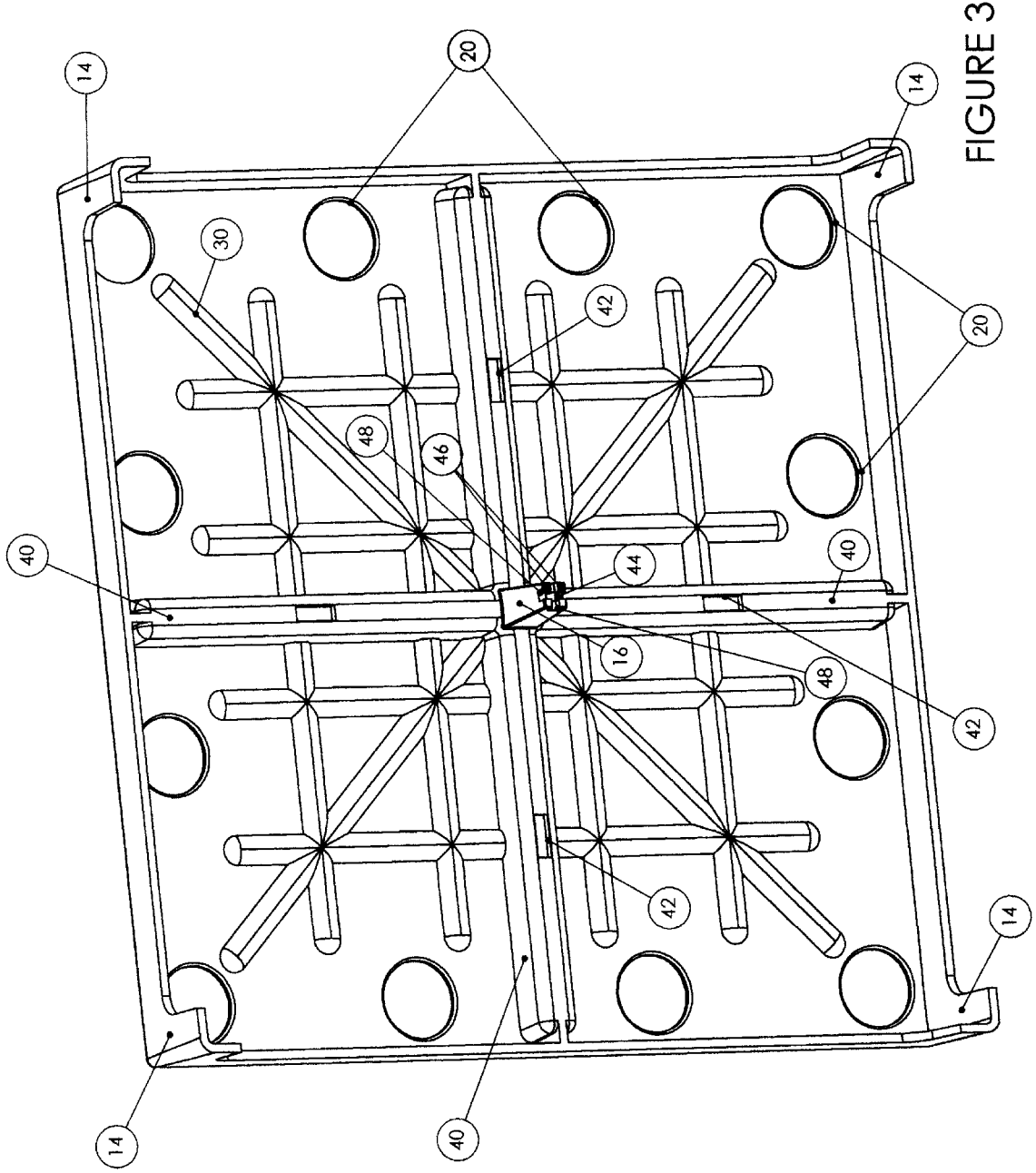
FIG. 3 is an isometric view of the bottom side of the planter tray of FIG. 1.

Referring specifically to FIGS. 1 through 3, the present invention includes a planter tray 10 having an upper surface 12 which is adapted to support potted plants. A plurality of legs 14, 16 depend downwardly from the upper surface. The planter tray is sized and configured to be received and supported by the legs in a manner whereby the upper surface 12 is located above the bottom wall 56 of a water container 50 (See FIG. 4). The planter tray 10 has a plurality of holes 20 provided in the upper surface 12 thereof. Said holes 20 are sized to provide access to human fingers to allow positioning and moving of the planter tray 10. Preferably, the planter tray 10 has a generally square configuration with legs 14 depending downwardly at each corner. At least one center leg 16 located near the center of the planter tray is also provided to provide additional support for the potted plants placed on the upper surface 12 of the planter tray 10.

As best shown in FIGS. 1 and 3, the plurality of channels 30, 32, 40 are formed into the upper surface 12 to provide additional structural strength to said upper surface. These channels also serve as drainage channels. As shown, a plurality of drainage channels 30, 40 extend radially outward from the center of the upper surface 12. As shown in FIG. 3, a drain opening 44 is provided at the center of the upper surface 12 in a drainage channel 40. The center leg 16 provides support for the upper surface yet allows liquid to pass therethrough by the provision of slots 48 in the bottom of the leg 16. These slots 48 create four extending projections 46 which contact the bottom wall 56 of the water container 50.

In addition to the drainage channels 30, 40 which extend radially outward from the center of the upper surface, a plurality of additional drainage channels 32 are provided at locations parallel to the outside perimeter edges of the upper surface 12 of the planter tray. As best shown in FIG. 3, drainage channels 30 and 32 are small or shallow drainage channels whereas drainage channels 40 are large and deeper. The small drainage channels 30, 32 empty into the large drainage channels 40. Water collected in large drainage channels 40 empties from the upper surface through opening 44 into the water container 50.

Figure 4:
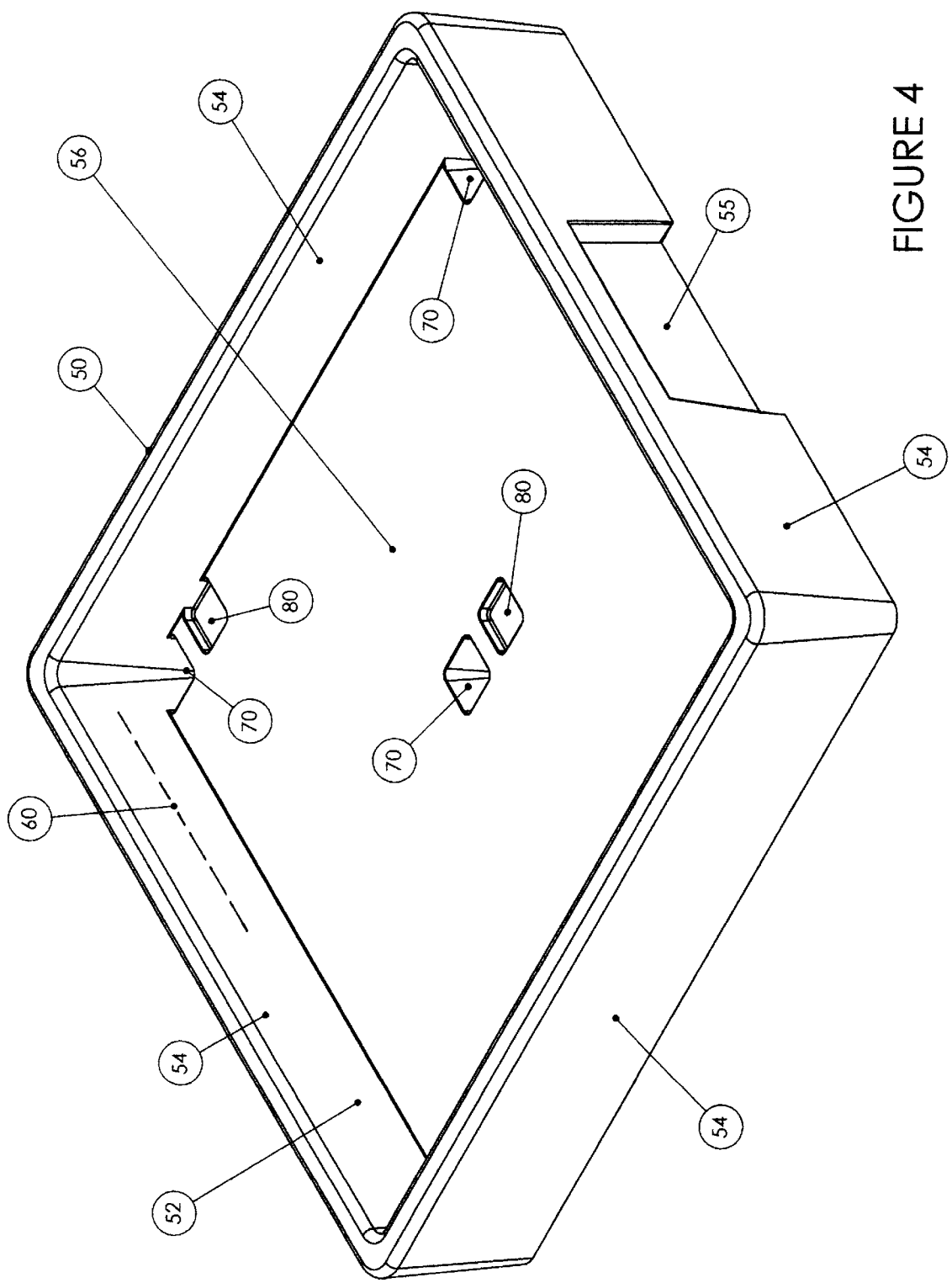
FIG. 4 is an isometric view of the top side of the water container of the present invention.
Figure 5:
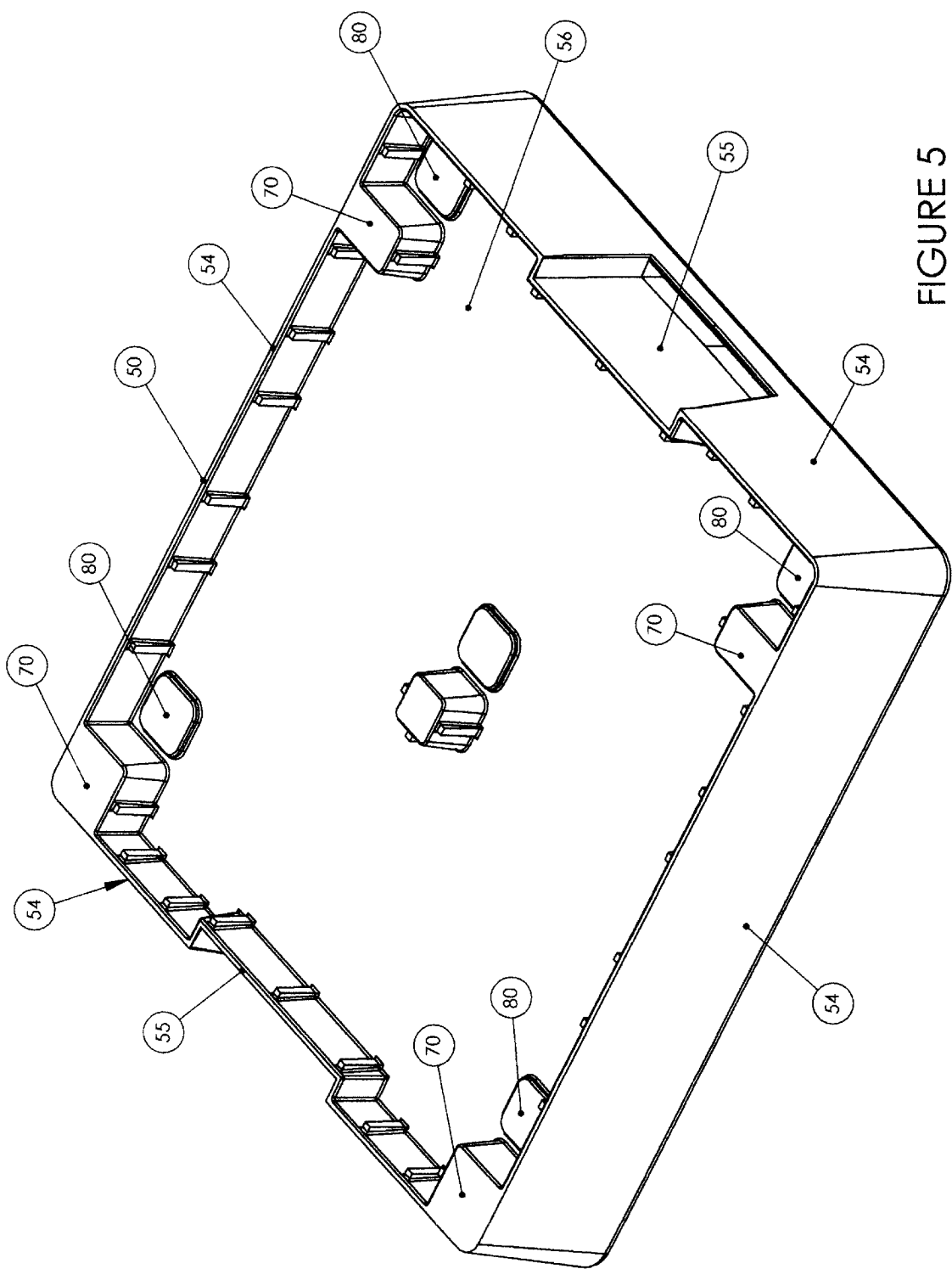
FIG. 5 is an isometric view of the bottom side of water container of FIG. 4.

Referring to FIGS. 4 and 5, the water container 50 is shown. Water container 50 includes an open top 52, closed side walls 54 and a closed bottom wall 56 which define a reservoir to receive liquid. The water container 50 is sized to receive the planter tray 10 in one of two positions, either an upper drainage position or in a lower watering position. Preferably, handles 55 are formed in at least two opposite side walls 54, as shown.

The planter tray shown in FIGS. 1 through 3 includes five legs. Correspondingly, the water container 50 includes five lower supporting means 70 and five upper supporting means 80 adapted to receive the legs of 14, 16 of the planter tray 10. As best shown in FIGS. 4 and 5, the lower supporting means 70 are located in the bottom wall 56 of the water container 50 and are located at a first lower elevational position. The lower supporting means 70 are adapted to receive and support the legs 14, 16 of the planter tray 10 such that such planter tray is positioned in a lower watering position.

The upper supporting means 80 are also located in the bottom wall 56 of the water container 50 but are located at a second upper elevational position. The upper supporting means 80 are adapted to receive and support the legs 14, 16 of the planter tray 10 such that the planter tray is positioned in an upper position.

The relative depth of the lower supporting means 70 and the upper supporting means 80 are designed such that when the planter tray 50 is manually moved to the lower position, potted plants supported on the planter tray 10 will be partially submersed in liquid allowing watering thereof. When the planter tray is manually moved to the upper drainage position, the potted plants supported on the planter tray 10 will be located completely above the liquid. The water container 50 is preferably filled with a liquid consisting of either water or water mixed with plant food to the fill line 60 (FIG. 4). Both the lower supporting means 70 and the upper supporting means 80 are integrally formed in the water container 50.

Figure 6:
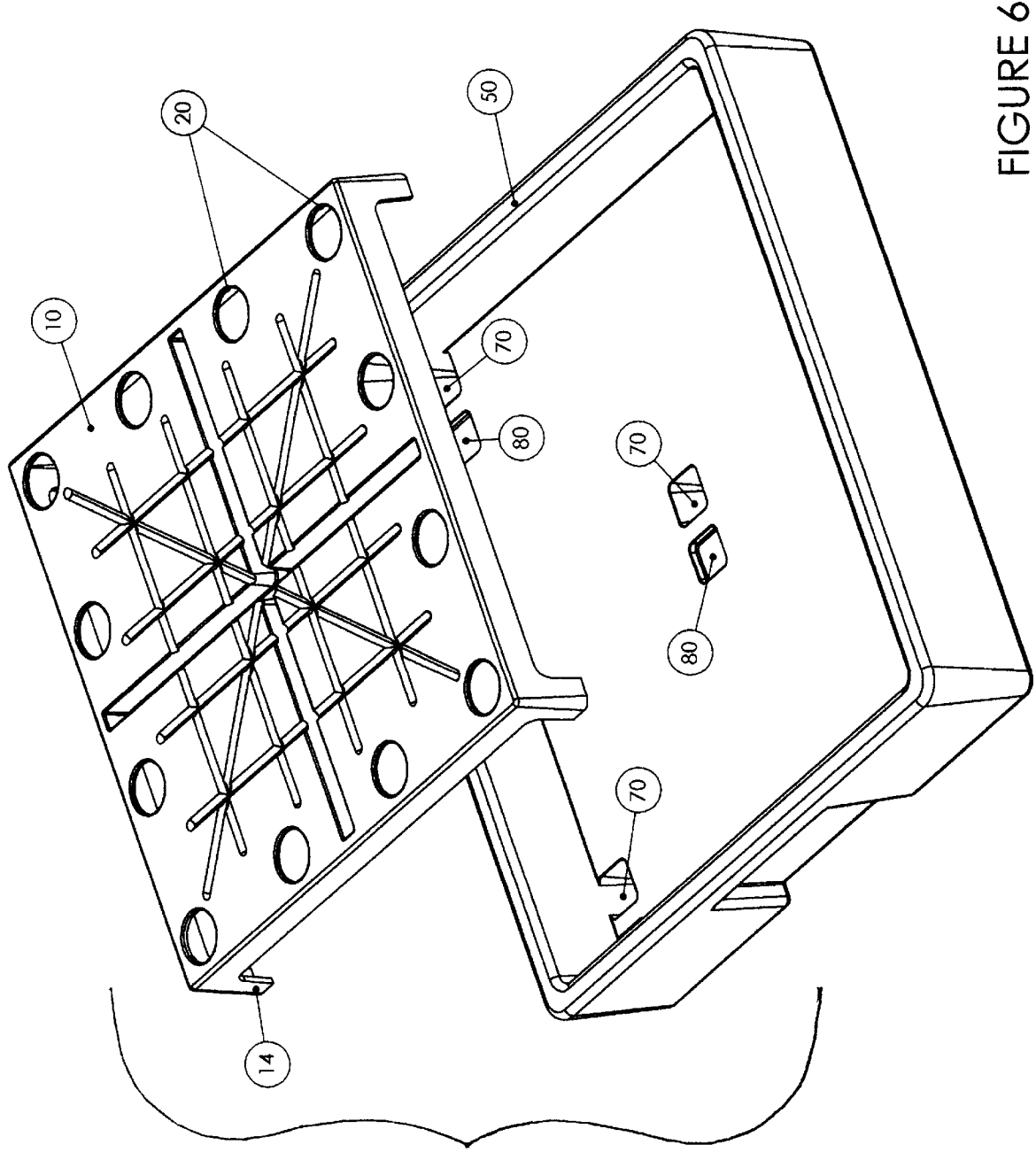
FIG. 6 in an exploded isometric view of the planter tray and water container of the preferred embodiment of the invention.
Figure 7:
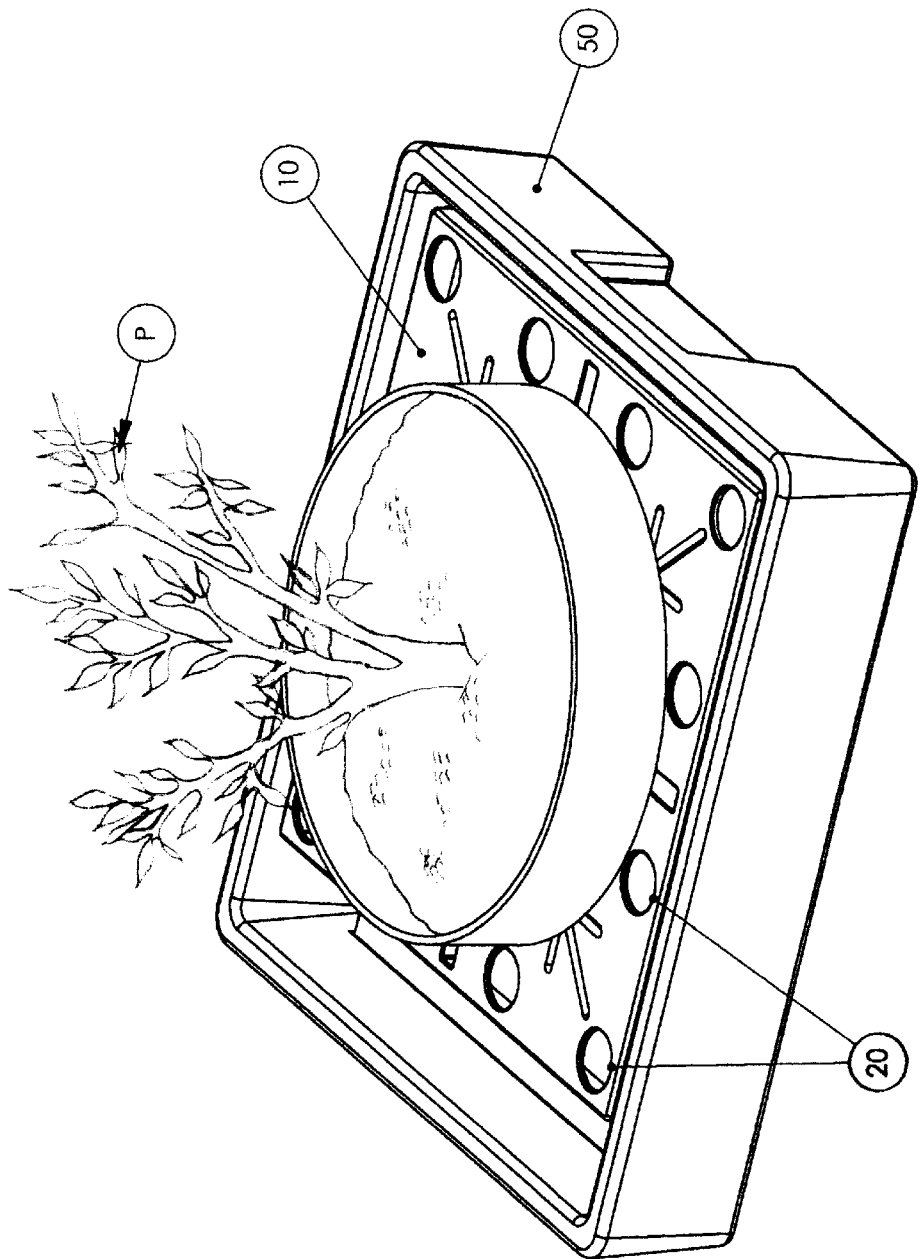
FIG. 7 is an isometric view of the plant watering device of the present invention in its assembled form in an upper drainage position and showing a potted plant supported on the planter tray.
Figure 8:
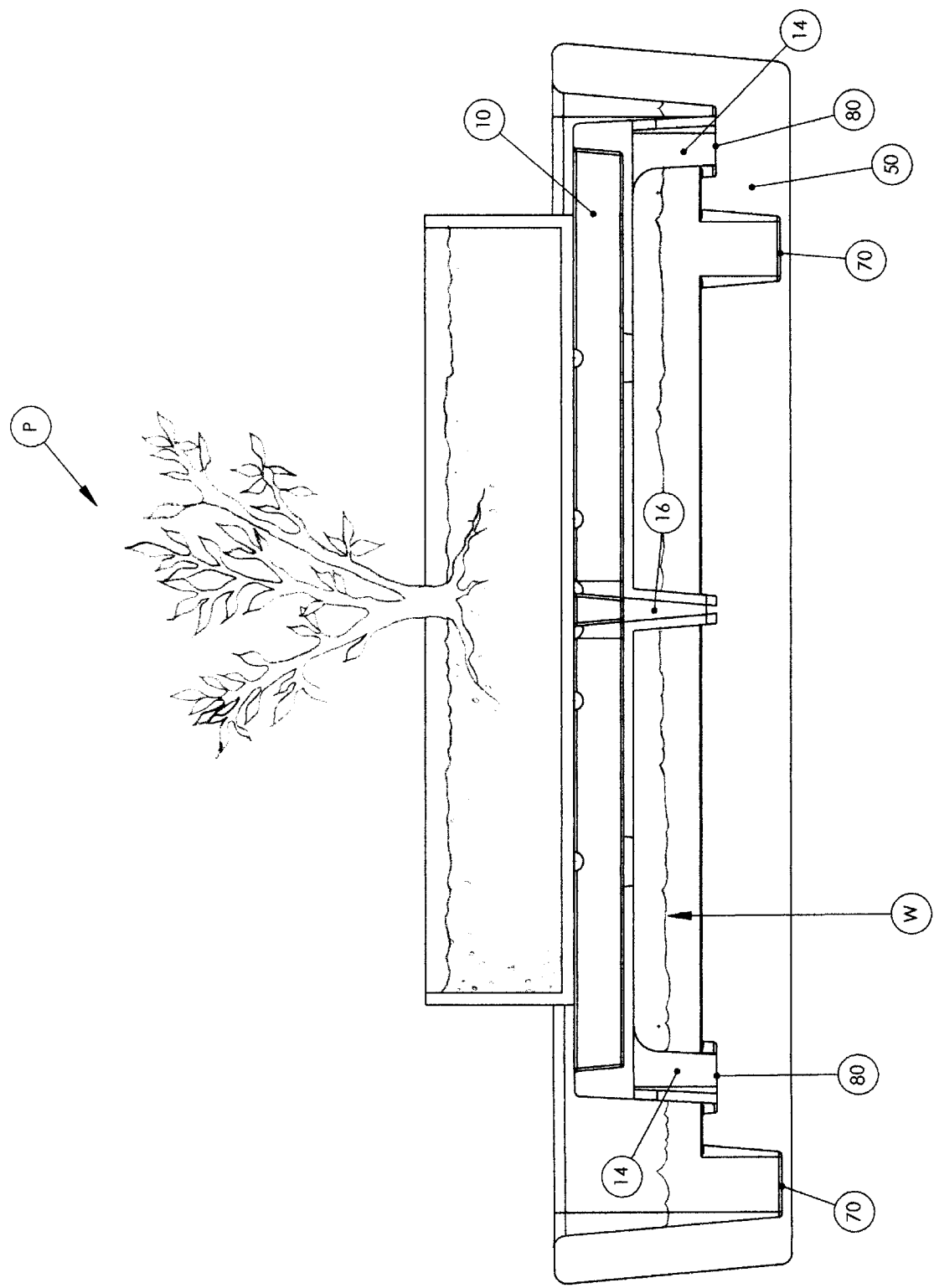
FIG. 8 is a cross-sectional view showing the planter tray in an upper drainage position.
Figure 9:
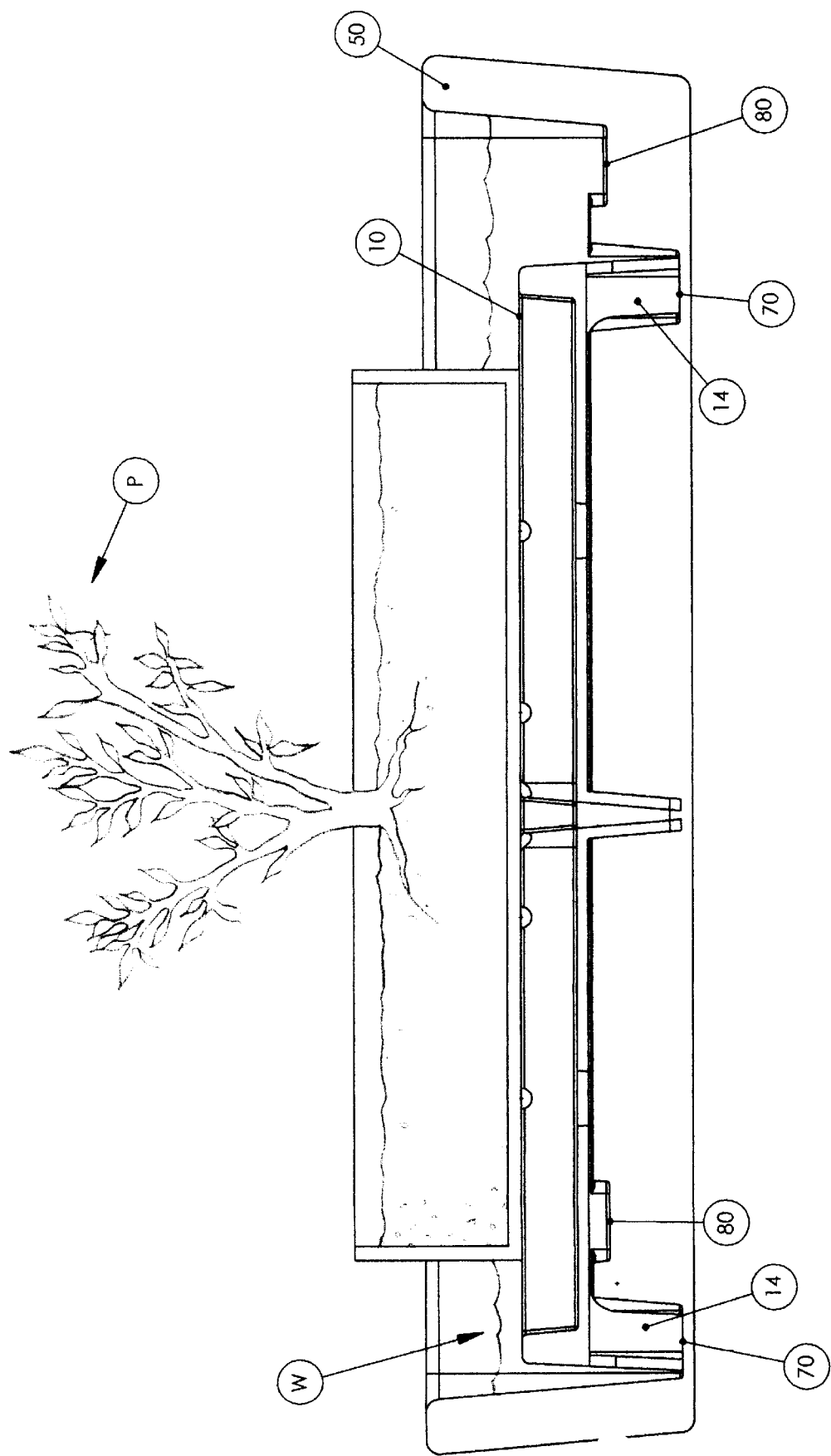
FIG. 9 is a cross-sectional view showing the planter tray in a lower watering position.

FIG. 6 shows the planter tray 10 as aligned above the water container 50. Referring to FIGS. 7, 8 and 9, in use, it will be obvious that while a potted plant P is positioned in the center of the planter tray 10, a user may simply insert his or her fingers into the openings 20 to manually move the upper planter tray 10 from an upper drainage position (wherein the legs 14, 16 are supported by upper supporting means 80 as shown in FIG. 8) to a lower watering position (wherein said legs 14, 16 are supported in said lower supporting means 70 as shown in FIG. 9). Once the potted plant has been allowed to receive a sufficient amount of water W or plant food by means of water entering the potted plant through one or more holes provided in the base thereof, the planter tray 10 is then manually moved back to the upper drainage position as shown in FIG. 8.

It will be obvious to those skilled in the art that rather than have the lower supporting means provided at a location beneath the bottom wall of the water container, that such lower supporting means could be provided at the same elevational position as the bottom of the container. With such an arrangement the lower supporting means could be provided at an elevational position essentially coplaner with the bottom wall of the water container and the upper supporting means would be provided at an elevational location above the bottom wall of the water container. With this arrangement, it is possible for the bottom wall of the water container to be positioned at a lower elevational position allowing for a greater volume of water with the same height of wall members as exist with the preferred embodiment.

Figure 10:
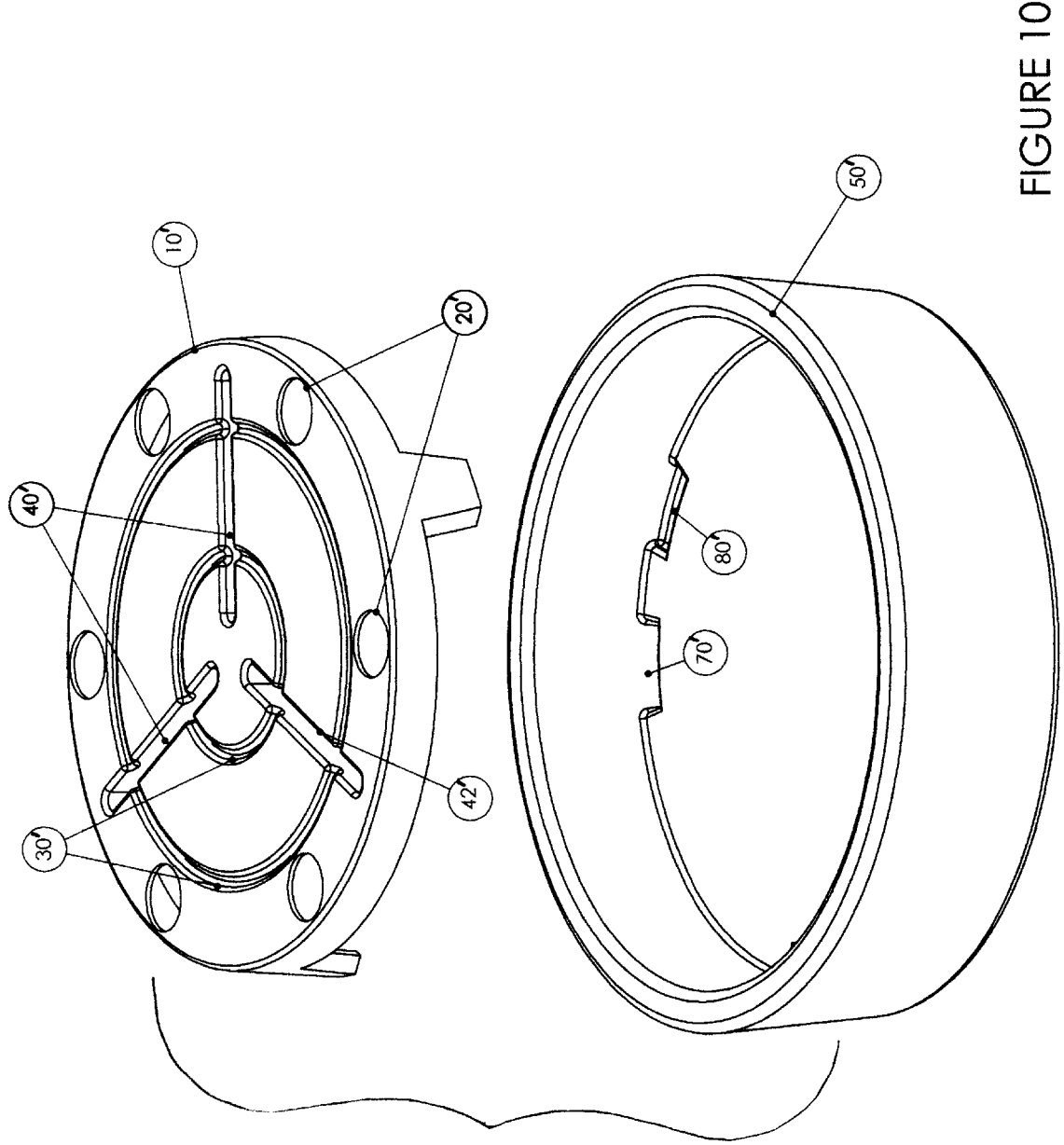
FIG. 10 is an isometric view in exploded form of an alternative upper tray member and watering container each of which have a generally circular form.

FIG. 10 shows an alternative form of the present invention which has a generally circular form. All numbered components have the same numbers as in the preceding Figures but are designated prime numbers.

Figure 11:
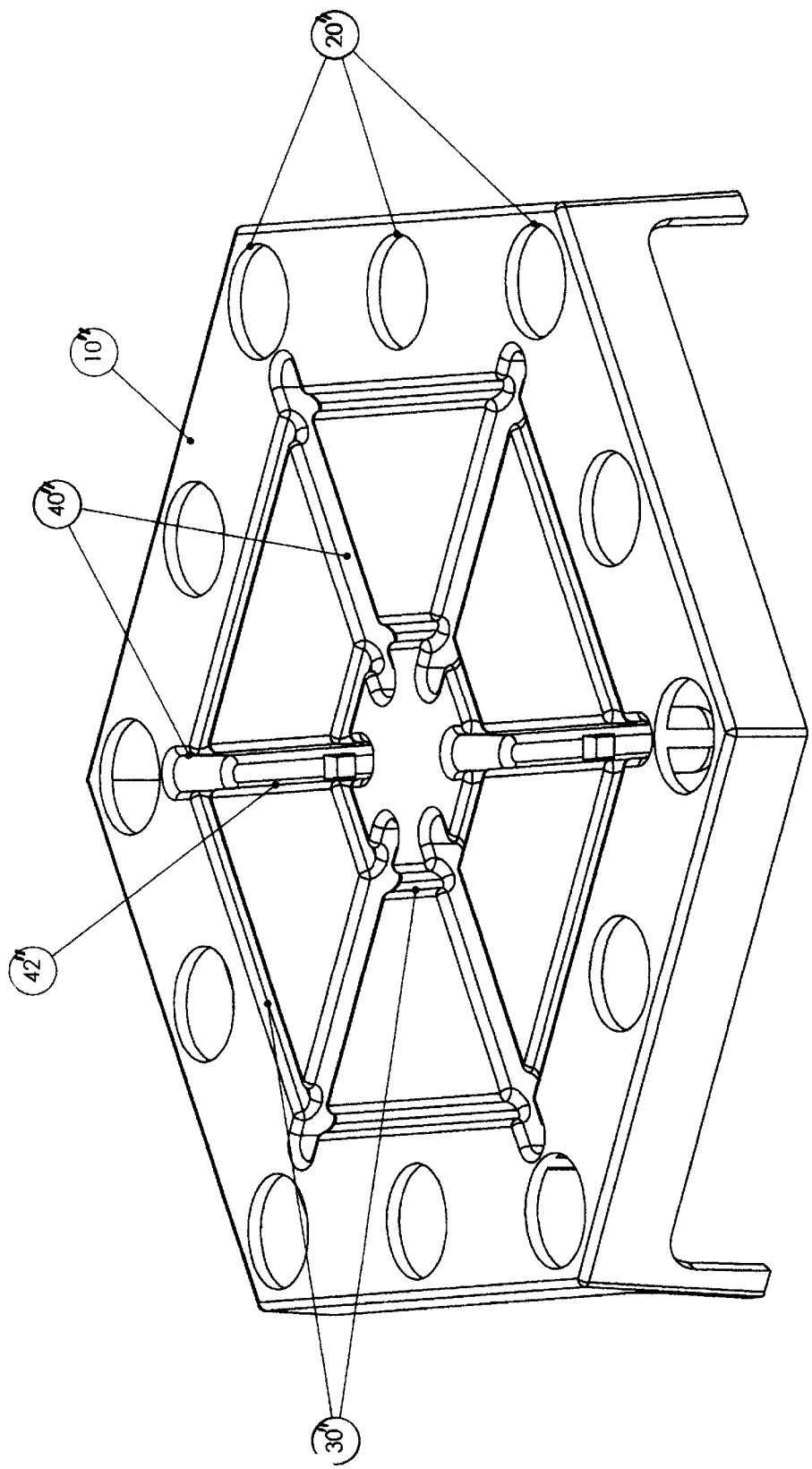
FIG. 11 is an isometric view of an alternative upper tray member which has a generally hexagonal form.
Figure 12:
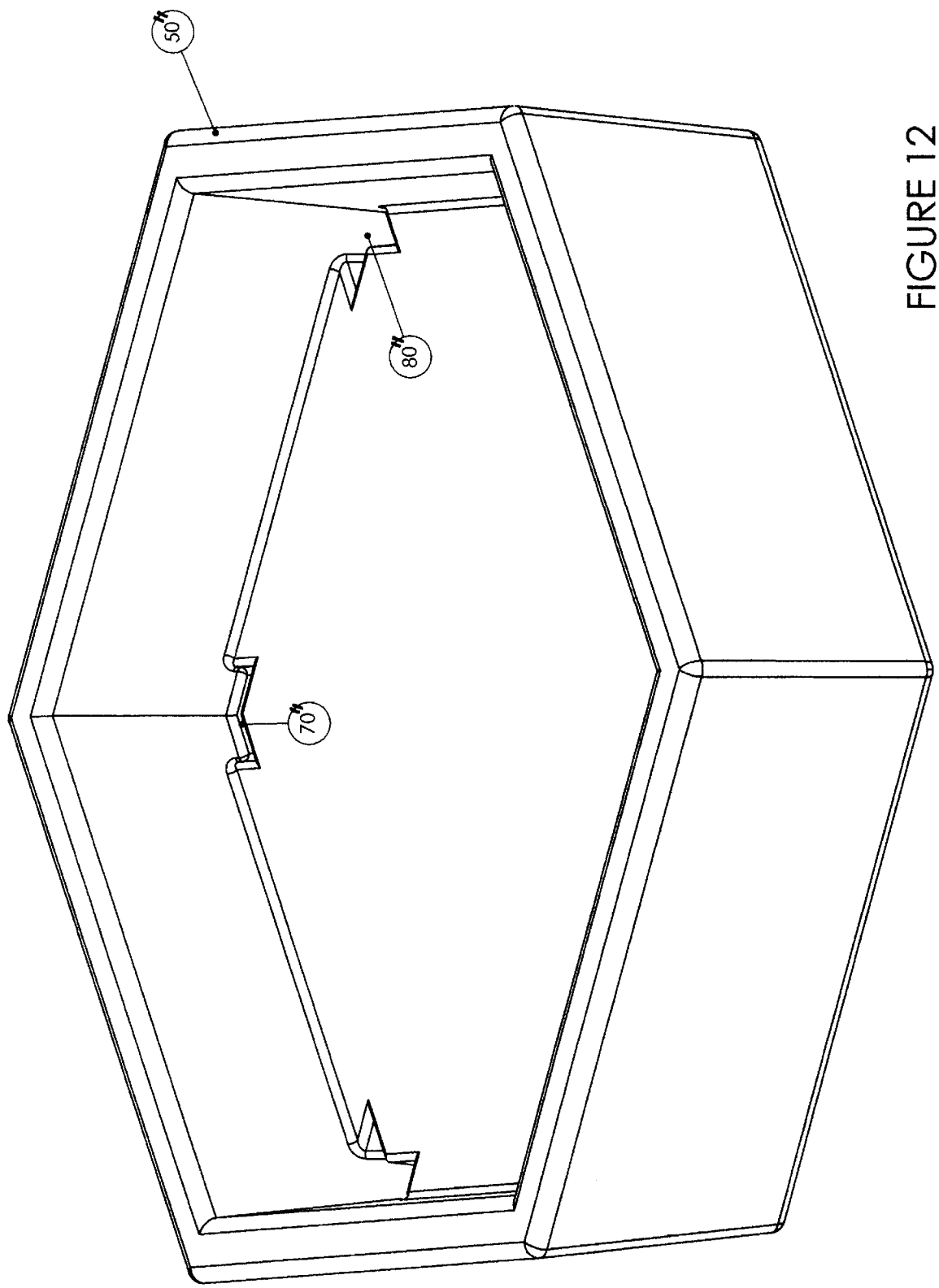
FIG. 12 is an isometric view of an alternative watering container which has a generally hexagonal form.

FIG. 11 and 12 show an alternative form of the present invention which has a generally hexagonal form. All numbered components have the same numbers as in the preceding Figures but are designated double prime numbers. Various other shapes and forms of the present invention will be obvious to those skilled in the art.

From the foregoing, a simple, inexpensive yet effective plant watering device has been shown and described. The device preferably consists of only two component parts which can be easily formed by injection molding techniques, preferably from a recycled plastic material. The plant watering device of the present invention is particularly useful for plants which rest upon desks or tables. Because the plant watering device is designed to have a low elevational profile, the device does not detract from the beauty of the potted plant which it is adapted to support.

While certain presently preferred embodiments of the present invention have been described and illustrated, it is to be distinctly understood that the invention is not limited thereto but may be otherwise embodied and practiced within the scope of the following claims.

I claim:

1. A plant watering device comprising:

a planter tray having an upper surface for supporting potted plants and having a plurality of legs depending downwardly from said upper surface, said planter tray sized and configured to be received and supported by said legs in a manner whereby said upper surface is located above a bottom wall of a water container;

a water container having an open top and closed side walls and a closed bottom wall which define a reservoir to receive a liquid, said water container sized to receive said planter tray;

lower supporting means located in the bottom wall of said water container and located at a first lower elevational position, said lower supporting means adapted to receive and support the legs of said planter tray such that the planter tray is positioned in a lower watering position; and upper supporting means located in the bottom wall of said water container located at a second upper elevational position, said upper supporting means adapted to receive and support the legs of said planter tray such that the planter tray is positioned in an upper position, whereby when said planter tray is manually moved to said lower position, potted plants supported on said planter tray will be partially submersed in said liquid to allow watering thereof and when said planter tray is manually moved to said upper drainage position, potted plants supported on said planter tray will be located completely above said liquid.

2. A plant watering device according to claim 1 wherein said planter tray has a plurality of holes provided in the upper surface thereof.

3. A plant watering device according to claim 2 wherein said holes are sized to provide access to human fingers to allow positioning and moving of the planter tray.

4. A plant watering device according to claim 2 wherein said holes allow passage of water vapor from water or liquid contained in said water container to reach potted plants supported on said upper surface.

5. A plant watering device according to claim 1 wherein said planter tray is generally square in shape and has at least four legs, with one leg located at each corner of said planter tray.

6. A plant watering device according to claim 1 wherein said planter tray has at least one center leg located near the center of said planter tray.

7. A plant watering device according to claim 6 wherein at least one center leg has a drain opening therein to allow liquid one said upper surface to drain into said water container.

8. A plant watering device according to claim 1 wherein the upper surface of said planter tray is formed to provide a plurality of channels therein to provide additional structural strength to said upper surface.

9. A plant watering device according to claim 1 wherein the upper surface of said planter tray is formed to provide a plurality of drainage channels therein with at least one drain opening in at least one of said drainage channels to allow liquid on said upper surface to drain into said water container.

10. A plant watering device according to claim 9 wherein at least some of said drainage channels extend radially outwardly from the center of said upper surface of said planter tray and wherein a drain opening is provided at the center of said upper surface in a drainage channel.

11. A plant watering device according to claim 9 wherein at least some of said drainage channels are provided at locations parallel to outside perimeter edges of said upper surface of the planter tray.

12. A plant watering device according to claim 9 wherein both small drainage channels and large drainage channels are provided wherein the small drainage channels empty into the large drainage channels and wherein said at least one drain opening provided in at least one of said large channels.

13. A plant watering device according to claim 1 said planter tray is formed of an injection molded material comprising at least one of polypropylene, polyethylene, and polystyrene.

14. A plant watering device according to claim 1 wherein said water container is formed of a blow molded material comprising at least one of polypropylene, polyethylene, and polystyrene.

15. A plant watering device according to claim 1 wherein said water container is integrally formed to include said lower supporting means and said upper supporting means.

16. A plant watering device according to claim 1 wherein said upper supporting means comprises shallow recessed pockets in the bottom wall of said water container, said shallow recessed pockets positioned to receive and support the legs of said planter tray when said planter tray is in an upper drainage position.

17. A plant watering device according to claim 1 wherein said lower supporting means comprises deep recessed pockets in the bottom wall of said water container, said deep recessed pockets positioned to receive and support the legs of said planter tray when said planter tray is in a lower watering position.

18. A plant watering device according to claim 1 wherein said lower supporting means comprises deep recessed pockets in the bottom wall of said water container, said deep recessed pockets positioned to receive and support the legs of said planter tray when said planter tray is in a lower watering position, said upper supporting means comprises shallow recessed pockets in the bottom wall of said water container, said shallow recessed pockets positioned to receive and support the legs of said planter tray when said planter tray is in an upper drainage position and wherein said shallow and deep recessed pockets are located adjacent to one another.

19. A plant watering device according to claim 1 wherein said lower supporting means comprises first leg retainers on the bottom wall of said water container, said first leg retainers positioned to receive and support the legs of said planter tray when said planter tray is in a lower watering position, and said upper supporting means comprises elevated second leg retainers extending above the bottom wall of said water container positioned to receive and support the legs of said planter tray when said planter tray is in an upper drainage position.

20. A plant watering device comprising:
a generally square planter tray having an upper surface for supporting potted plants and having five legs depending downwardly from said upper surface, said legs positioned on the four corners and in the center of said planter tray, said planter tray sized and configured to be received and supported by said legs in a manner whereby said upper surface is located above a bottom wall of a water container, said upper surface of said planter tray having a plurality of drainage channels therein with at least one drain opening in at least one of said drainage channels to allow liquid one said upper surface to drain into said water container;
a generally square water container having an open top and closed side walls and a closed bottom wall which define a reservoir to receive a liquid,
lower supporting means located in the bottom wall of said water container and located at a first lower elevational position, said lower supporting means adapted to receive and support the legs of said planter tray such that such planter tray is positioned in a lower position; and
upper supporting means located in the bottom wall of said water container located at a second upper elevational position, said upper supporting means adapted to receive and support the legs of said planter tray such that the planter tray is positioned in an upper drainage position, wherein said lower supporting means comprises deep recessed pockets in the bottom wall of said water container, said deep recessed pockets positioned to receive and support the legs of said planter tray when said planter tray is in a lower watering position, said upper supporting means comprises shallow recessed pockets in the bottom wall of said water container, said shallow recessed pockets positioned to receive and support the legs of said planter tray when said planter tray is in an upper drainage position, whereby when said planter tray is manually moved to said lower watering position, potted plants supported on said planter tray will be partially submersed in said liquid to allow watering thereof and when said planter tray is manually moved to said upper drainage position, potted plants supported on said planter tray will be located completely above said liquid.

21. A plant watering device according to claim 1 wherein said planter tray and said watering container are each generally circular in shape.

22. A plant watering device according to claim 1 wherein said planter tray and said watering container are each generally hexagonal in shape.

* * * * *